United States Patent [19]

Nydegger

[11] Patent Number: 4,890,962

[45] Date of Patent: Jan. 2, 1990

[54] PORTABLE POSITIVE FEED DRILL

[75] Inventor: Daniel L. Nydegger, Auburn, Wash.

[73] Assignee: The Boeing Company, Seattle, Wash.

[21] Appl. No.: 312,615

[22] Filed: Feb. 16, 1989

[51] Int. Cl.⁴ .............................................. B23B 41/00
[52] U.S. Cl. ...................................... 408/14; 408/79;
408/99; 408/103; 408/138
[58] Field of Search ....................... 408/14, 15, 79, 98,
408/99, 100, 101, 102, 103, 108, 110, 111, 138,
141, 129

[56] References Cited

U.S. PATENT DOCUMENTS

| | | |
|---|---|---|
| 434,576 | 8/1890 | Wyman . |
| 597,377 | 1/1898 | Moore ................................ 408/101 |
| 788,888 | 5/1905 | Cross .................................. 408/79 |
| 960,097 | 5/1910 | Keithley et al. ...................... 408/79 |
| 1,249,045 | 12/1917 | Diffendall ............................. 408/99 |
| 1,434,946 | 11/1922 | Fiorillo ................................. 408/79 |
| 2,791,922 | 5/1957 | Robinson . |
| 2,961,899 | 11/1960 | Grove et al. . |
| 3,013,285 | 12/1961 | Arengo ................................. 10/139 |
| 3,124,817 | 3/1964 | Mosier ................................. 10/128 |
| 3,421,392 | 1/1969 | Bangerter et al. . |
| 3,429,206 | 2/1969 | Quackenbush . |
| 3,512,434 | 5/1970 | Juhasz et al. . |
| 3,679,320 | 7/1972 | Bohorquez et al. ................. 408/99 |
| 3,804,544 | 4/1974 | Adams ................................. 408/14 |
| 3,897,166 | 7/1975 | Adams ................................. 408/14 |
| 4,083,646 | 4/1978 | Vindez ................................. 408/133 |
| 4,097,175 | 6/1978 | Tsukiji ................................. 408/23 |
| 4,182,588 | 1/1980 | Burkart et al. ....................... 408/14 |
| 4,387,284 | 6/1983 | Nicholas et al. ..................... 408/97 |

FOREIGN PATENT DOCUMENTS 631360 12/1927 France ................................ 408/137

Primary Examiner—Daniel Howell
Attorney, Agent, or Firm—Joan H. Pauly

[57] ABSTRACT

A drill spindle (62) is carried by the forward end of an elongated gear housing (12, 14). A parallel drive shaft (84) is carried by the housing (12, 14) rearwardly of the spindle (62). A parallel lead screw (92) is positioned between the spindle (62) and drive shaft (84) and is attached to a workpiece-engaging foot (20). A plurality of gears transmit rotation of the drive shaft (84) to the spindle (62) and lead screw (92). Two leader pins (182) are attached to the foot (20) and engaged by bearings (186) carried by the housing (12, 14) to slide freely relative thereto and to provide stiffness between the housing (12, 14) and the foot (20). The leader pins are spaced laterally and rearwardly from the drive shaft (84). A fluid activated pusher member (30) cooperates with the foot (20) to wedge the forward end of the drill (10) in a recessed work area. A fluid operated dog clutch (124, 132) engages rotation of the lead screw (92). Coolant may be provided through a flat profile inducer (18) and axial passages in the spindle (62) and bit (74).

27 Claims, 6 Drawing Sheets

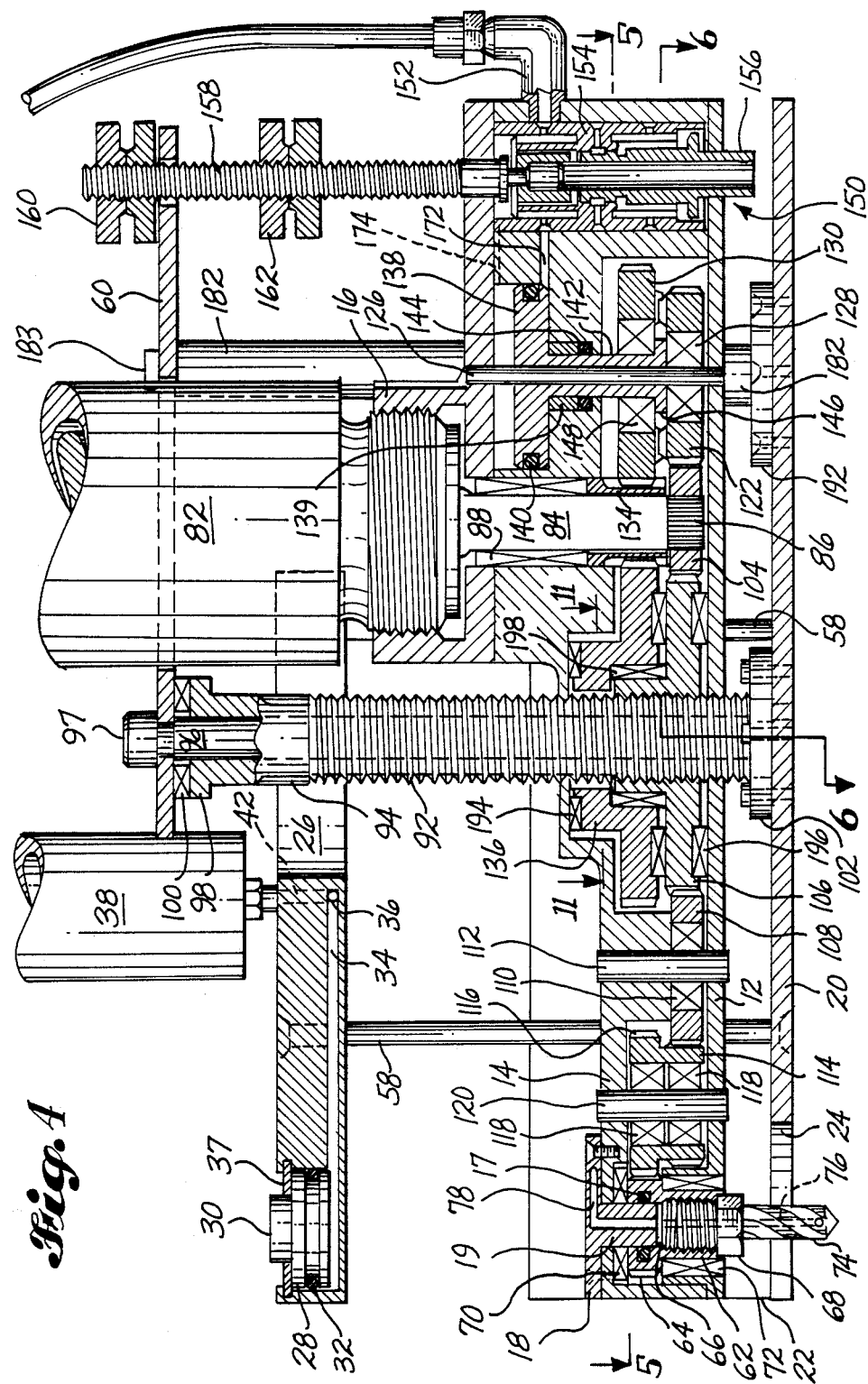

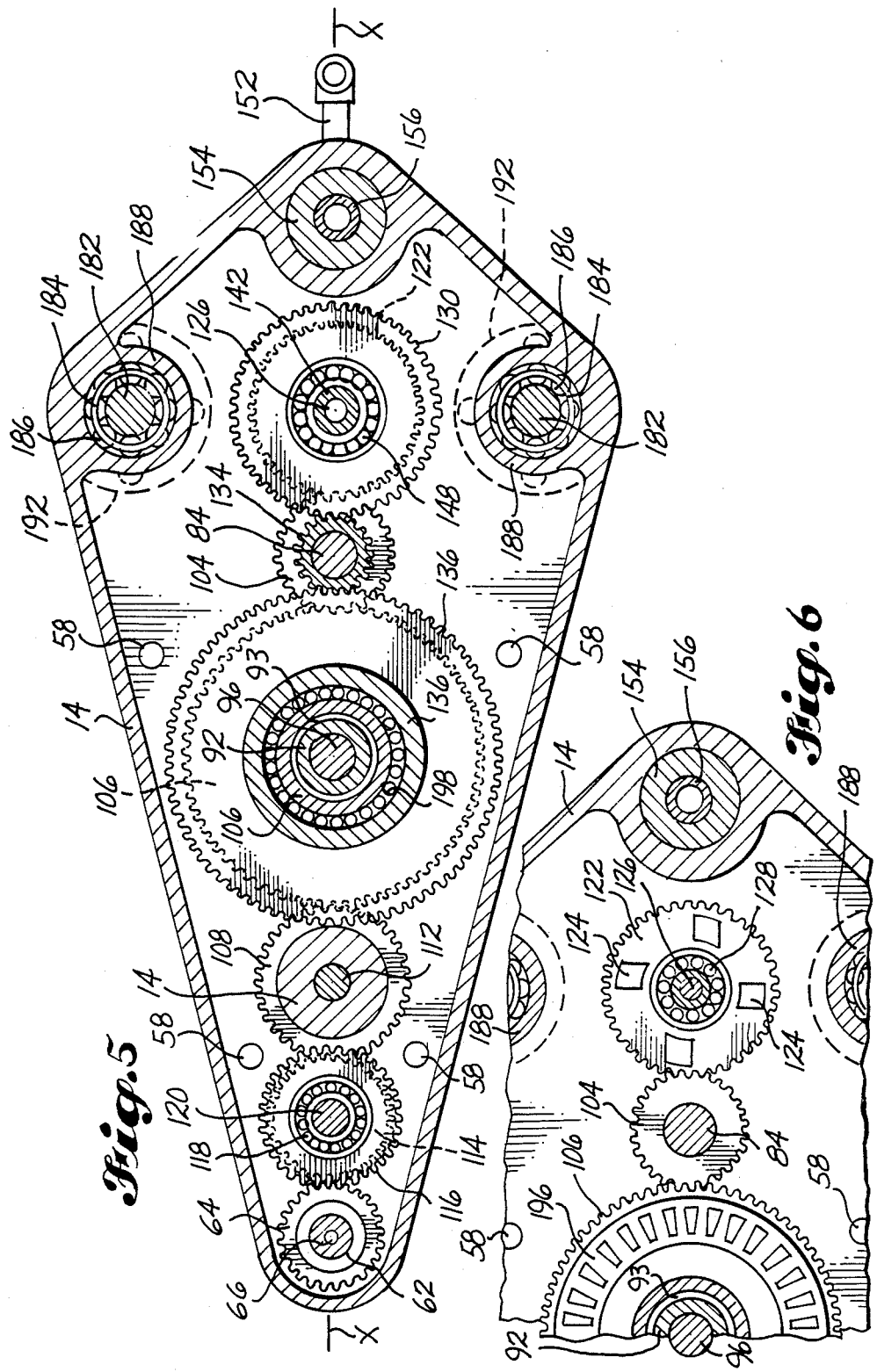

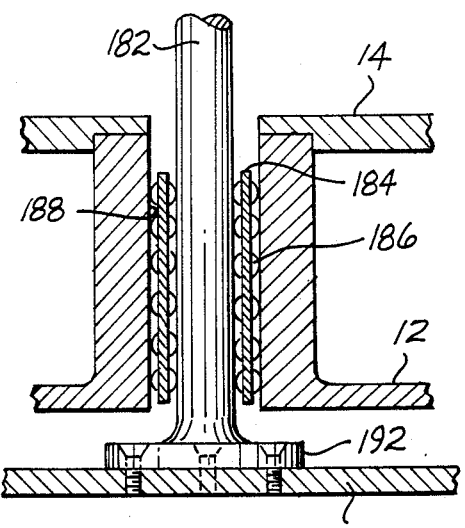
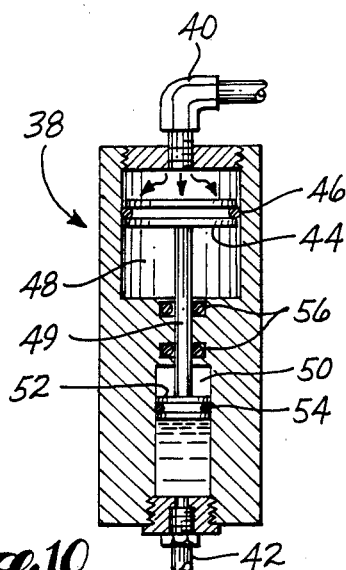
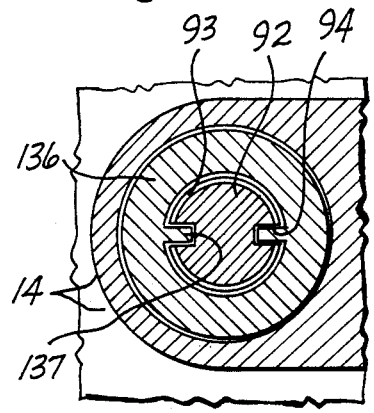
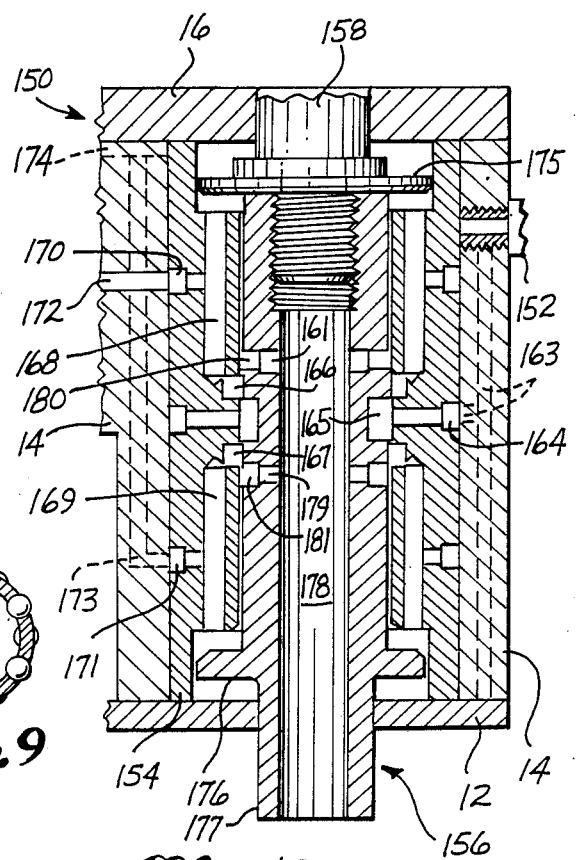
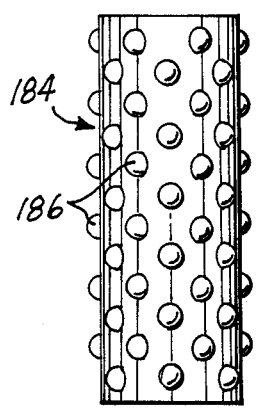
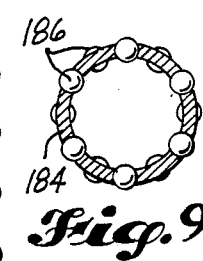

PORTABLE POSITIVE FEED DRILL

TECHNICAL FIELD

This invention relates to positive feed drills and, more particularly, to such a drill capable of drilling in limited access areas and having a drill spindle spaced from a motor drive shaft, a feed member parallel to the spindle and attached to a workpiece engaging foot, and a leader pin parallel to the feed member and attached to the foot and sliding in bearings to provide stiffness between the foot and the housing which carries the motor and the spindle.

BACKGROUND ART

In the aircraft industry, there is a need for a lightweight portable drill that is capable of drilling holes in limited access areas, is capable of drilling holes in a variety of materials, and is economical to manufacture, use, and maintain. An example of a situation in which such a drill is needed is the installation of titanium bathtub fittings or seal pans. Such a fitting is illustrated in FIG. 2. The fitting acts as a fuel dam between wet and dry areas of a fuel tank. The fitting is attached to the skin of the tank and its integral stringers, as shown in FIG. 2. Fastener holes must be drilled from the inside of the fitting outward to avoid damage to the composite material skin. Thus, the drill must be capable of operating within the limited area inside the fitting. The type of fitting shown in FIG. 2 typically has dimensions of 2 inches×4 inches×2 inches. In addition, in some cases the fitting is not quite rectangular but has up to a 15° slope to compensate for wing curvature. A survey of commercially available drills failed to uncover a drill suitable for use in the type of environment illustrated in FIG. 2.

The patent literature includes numerous examples of drills with widely varying characteristics. U.S. Pat. No. 3,679,320, granted July 25, 1972, to L. Bohorquez et al. discloses a portable pneumatic drill that is described as being designed for drilling holes in recessed areas where access is difficult. The drill has a body with a right angle motor at one end and a drill spindle at the opposite end. The motor drives the spindle by means of a gear train including meshing bevel gears. Two lead screws are positioned between the motor and the spindle. The screws are attached to a footplate which is adapted to be clamped to the underside of a workpiece, such as by a C-clamp. A second gear train drives the lead screws. One of the lead screws has adjustable stops to limit relative travel between the body and the footplate. The stops operate a limit valve. A pneumatically operated piston and cylinder activates a ball and detent clutch to engage and disengage the gear trains.

U.S. Pats. No. 3,804,544, granted Apr. 16, 1974, and No. 3,897,166, granted July 29, 1975, to R. D. Adams, issued on applications that were related as parent and divisional applications. These patents disclose a positive feed drill in which the motor drive shaft is concentric with the drill spindle. A parallel lead screw is engaged by a pivotable arm to move the drill housing relative to a pressure foot. The lead screw is driven by the motor via a gear train and is provided with a friction clutch. The pressure foot is connected to the housing by a guide shaft to which the arm is pivoted. A load on the pressure foot created by urging it against the workpiece activates the clutch. In one embodiment, a spring biased return shaft is provided for automatically advancing the pressure foot when pressure against the workpiece is removed. In two other embodiments, the housing is secured to a drilling fixture, or the pressure foot is clamped to the workpiece by a pin that threadedly engages the workpiece, and a cylinder urges the housing and pressure foot against the workpiece.

U.S. Pat. No. 2,961,899, granted Nov. 29, 1960, to J. E. Grove et al., discloses a drilling machine in which the spindle housing and driving mechanism is mounted on a frame for sliding to various elevations above a work support table. The drill spindle is parallel to the drive shaft of the motor and is driven thereby by means of a belt and pulley mechanism. A rack and pinion is manually operated to provide axial translation of the drill. The rack is in the form of a reciprocable screw positioned parallel to the spindle.

A positive feed drill having a coaxial drill spindle and lead screw and a parallel offset motor is disclosed in U.S. Pat. Nos. 434,576, granted Aug. 19, 1890, to H. B. Wyman; 2,791,922, granted May 14, 1957, to C. L. Robinson; 3,013,285, granted Dec. 19, 1961, to C. G. Arengo; 3,124,817, granted Mar. 17, 1964, to K. C. Mosier; and 4,182,588, granted Jan. 8, 1980, to R. C. Burkart et al. The Wyman drill includes lugs for attaching a clamp. The Robinson device has a manual dog-type clutch. The Arengo drill has a rod that is parallel to the drive shaft of the spindle and that moves with such drive shaft and carries stop nuts which engage switches to limit movement of the spindle. The Mosier device includes a dog-type clutch. One embodiment is described as being for use in remote, hard-to-reach locations and has a laterally elongated housing in which the drill spindle and drive shaft are mounted on opposite end portions. The Burkart et al. drill includes a dog-type, piston operated clutch and an annular nozzle on the nose surrounding the drill bit for cooling. One embodiment includes a sensing rod parallel to the spindle that engages the nose and is slidably supported in guide bushings.

U.S. Pat. Nos. 3,512,434, granted May 19, 1970, to D. P. Juhasz et al., and 4,083,646, granted Apr. 11, 1978, to P. G. Vindez, each disclose a positive feed drill with a lead screw coaxial with the drill spindle and an offset right angle motor. Juhasz et al. state that coolant may be provided through the spindle and that various fixtures and clamping devices may be used to secure the drill and workpiece together. The dog-clutch may be operated by a lever or a fluid operated piston. The drill spindle is provided with stop nuts for controlling limits of travel. The Vindez drill includes two piston valves for operating the clutches.

U.S. Pat. No. 3,429,206, granted Feb. 25, 1969, to R. C. Quackenbush, discloses a right angle positive feed drill with a unitary feed screw and spindle and a worm gear drive mechanism. U.S. Pat. No. 3,421,392, granted Jan. 14, 1969, to K. R. Bangerter et al., discloses a portable gun-type pneumatic hand drill in which a valve is actuated by contact with a workpiece to supply coolant fluid through a bore in the barrel of the bit. U.S. Pat. No. 4,097,175, granted June 27, 1978, to Y. Tsukiji, disclose as a combined drilling and turning machine in which a workpiece is mounted on a turntable and a pivotable bit is provided for drilling holes in right angular surfaces.

The above-cited patents and the prior art that is discussed and/or cited therein should be studied for the purpose of putting the present invention into proper perspective relative to the prior art.

DISCLOSURE OF THE INVENTION

The subject of the invention is a positive feed drill. According to an aspect of the invention, the drill comprises a housing elongated along a main axis, and a drill spindle carried by a forward end portion of the housing. The spindle is perpendicular to the axis and is adapted to hold a drill bit. A motor is carried by the housing and has a drive shaft spaced rearwardly from the spindle along the axis. The drill also has a foot positioned to engage a workpiece. An elongated feed member is parallel to the spindle and positioned between the spindle and the drive shaft. The feed member has an outer end attached to the foot. Drive train means is provided in the housing for transmitting rotation of the drive shaft to rotate the spindle, and to translate the housing relative to the feed member toward and away from the foot. The drill includes at least one leader pin parallel to and spaced rearwardly from the feed member. The leader pin has an outer end attached to the foot. Bearing means carried by the housing engages the pin to allow the housing to slide freely along the pin. The bearing means cooperates with the pin to provide stiffness between the housing and the foot. Preferably, the drill comprises two such leader pins positioned on laterally opposite sides of the drive shaft. In the preferred embodiment, the leader pins are spaced laterally and rearwardly from the drive shaft. This arrangement helps maximize the stiffening provided.

A feature of the invention is the cooperation of the foot and a pusher member to engage a recessed area of a workpiece. In drills including this feature, the foot has a forward end positioned and dimensioned to fit inside a recessed area of a workpiece having a surface to be drilled. The pusher member is substantially aligned with the forward end of the foot and is movable away from said forward end to engage, inside the recessed area, a surface opposite the surface to be drilled. This arrangement secures the drill in position relative to the workpiece. A major advantage of this feature of the invention is that it provides a relatively simple and effective means for securing the relative position of the drill when limited access areas are being drilled. The feature is especially advantageous when there is o ready access to the underside of the surface of the workpiece being drilled and, thus, use of a clamp to clamp the foot to the workpiece is precluded. The preferred means for moving the pusher member is a fluid activated cylinder. This preferred means has the advantages of simplicity and reliability and of allowing a predetermined amount of force to be exerted against the pusher member to urge it against the workpiece surface. The determination of the amount of force required to firmly secure the drill may be based on a variety of factors, including the hardness of the material being drilled.

Other elements of the basic drill of the invention, such as the feed member, the drive train means, and the motor and drive shaft, may be provided in various forms. In its preferred form, the feed member comprises a lead screw that is rotated by the drive train means. The preferred form of the drive train means includes a plurality of gears for transmitting rotation of the drive shaft. In drills of the invention including both of these preferred forms, the gears of the drive train means preferably transmit rotation of the drive shaft to rotate the spindle and the lead screw. A preferred feature of the drive train means is a dog-type clutch for engaging and disengaging rotation of the lead screw. In the preferred embodiment, a fluid activated cylinder moves one of the gears toward and away from another of the gears to operate the clutch. In the preferred form of the motor, the drive shaft is parallel to the drill spindle.

The drill of the invention is also preferably provided with means for delivering fluid coolant to a drill bit held by the spindle. To accomplish this, the preferred embodiment of the drill includes a passageway formed by the housing. The passageway has a first end opening onto an outer surface of the housing for receiving an end of a conduit, and a second end positioned to communicate with an axial opening in the spindle to deliver fluid coolant to an axial opening in a drill bit held by the spindle. This arrangement has the advantages of structural simplicity and ease of operation. When cooling is desired, a conduit from a source of fluid coolant may easily be attached to the first end of the passageway. When a different type of coolant is desired or when it is desired to discontinue cooling, the conduit may easily be detached from the passageway and, if desired, replaced by another conduit.

Another preferred feature of the invention is a snap action valve for commencing retraction of the housing away from a workpiece substantially instantaneously when the drill bit reaches a predetermined drilling depth. This feature makes it possible to control the drilling depth with a high degree of accuracy.

The drill of the invention is highly versatile and can be used in a variety of limited access work areas where use of known drills is impossible or extremely difficult. The preferred feature of a pusher member allows the drill to be used in recessed work areas and to be secured relative to the workpiece regardless of the accessibility or lack of accessibility of the underside of the surface being drilled. The leader pin feature of the drill provides sufficient relative stiffness between the housing and the foot to counteract the drill thrust generated when drilling very hard materials, such as titanium. The drill of the invention is also suitable for drilling a variety of other types of material. For example, the positive feed of the drill helps prevent fiber breakout when composite materials, such as graphite fiber reinforced epoxy resin matrix composite materials, are being drilled. The drill of the invention provides a cost effective portable and lightweight drill that is durable and easy to operate.

These and other advantages and features will become apparent from the detailed description of the test mode for carrying out the invention that follows.

BRIEF DESCRIPTION OF THE DRAWINGS

In the drawings, like element designations refer to like parts throughout, and:

FIG. 4 is like FIG. 3 except that it shows the housing in a lowered work position.

FIG. 5 is a sectional view taken substantially along the line 5—5 in FIG. 4.

FIG. 6 is a fragmentary sectional view taken substantially along the line 6—6 in FIG. 4.

FIG. 7 is a vertical sectional view of one of the leader pins and its associated bearing and surrounding structure, with parts shown in elevation.

FIG. 8 is an elevational view of the bearing member shown in FIG. 7.

FIG. 9 is a cross-sectional view of the structure shown in FIG. 8, with the ball members shown in elevation.

FIG. 10 is a vertical sectional view of the reservoir for activating the push member.

FIG. 11 is a sectional view taken substantially along the line 11—11 in FIG. 4. FIG. 12 is an enlarged vertical sectional view of the spool valve of the preferred embodiment, with parts shown in elevation.

BEST MODE FOR CARRYING OUT THE INVENTION

Figure 2:
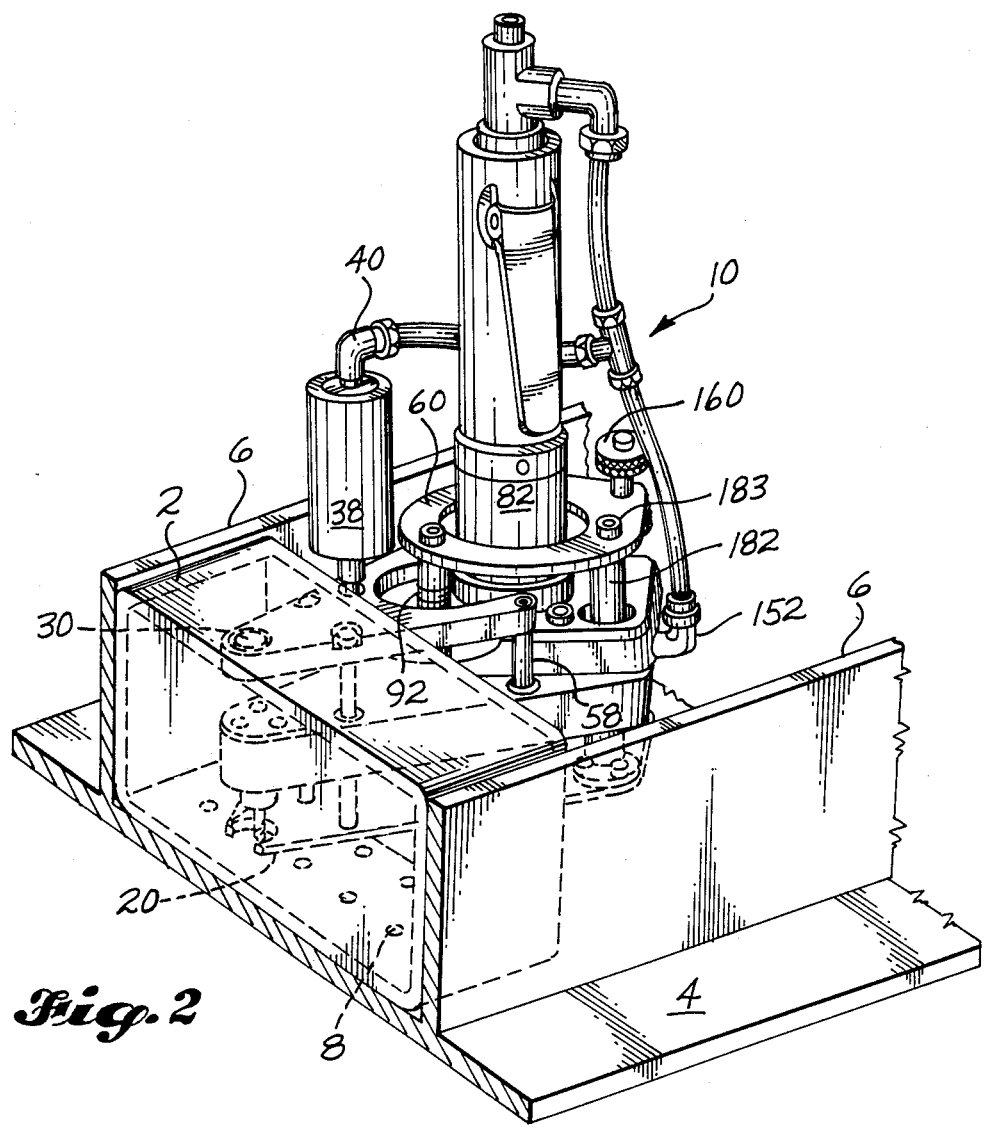
FIG. 2 is a pictorial view of the preferred embodiment being used to drill holes within a recessed area.

The drawings show a drill 10 that is constructed according to the invention and that also constitutes the best mode for carrying out the invention currently known to the applicant. FIG. 2 illustrates the drill 10 being used to drill holes inside a recessed area of a workpiece. The design of the drill of the invention makes its use particularly advantageous in environments such as that illustrated in FIG. 2. However, it is of course to be understood that the drill of the invention may also be used to advantage for drilling other types of workpieces with a variety of configurations and varying degrees of accessibility.

Referring to FIGS. 1–4, the preferred embodiment of the drill 10 includes a gear housing having a bottom portion 12 and a top portion 14. The top portion 14 has a sidewall extending perpendicularly downwardly therefrom (as shown) to form the sides of the housing. A motor adapter 16 is secured to the upper surface of the top portion 14 for mounting a motor 82 onto the housing. The motor 82 is threadedly secured within a socket formed by the adapter 16, and the drive shaft 84 of the motor 82 extends downwardly into the housing through aligned openings in the bottom wall of the socket and the top housing portion 14. The housing also includes a flat profile fluid inducer 18 that is mounted on the forward end of the upper surface of the top portion 14. The housing has a main longitudinal axis X (FIG. 5) along which it is elongated.

The drill 10 has a workpiece-engaging foot 20 that is translatably attached to the gear housing by a lead screw 92. The foot 20 has substantially the same plan form as the bottom and top housing portions 12, 14. The plan form of the top housing portion 14 is best seen in FIG. 5. The relatively narrow forward end of the foot 20 has a notch 24 extending therethrough to provide clearance for the bit 74. The foot 20 has an upwardly and outwardly extending projection 22 for stiffening the foot 20.

Figure 3:
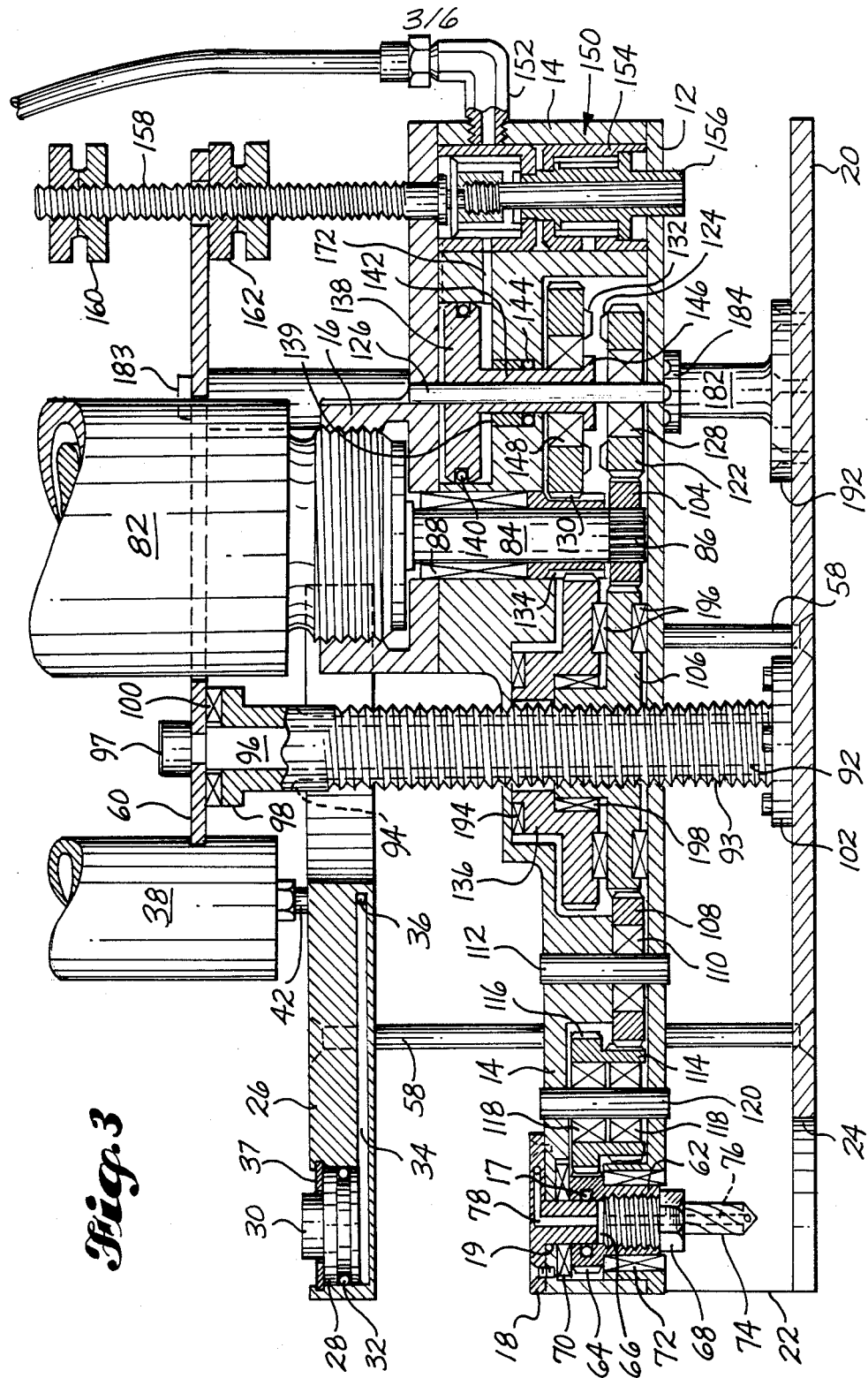
FIG. 3 is a vertical sectional view of the preferred embodiment showing the housing in a retracted nonuse position, with portions shown in elevation.

The drill 10 is also provided with a pusher member 30 that cooperates with the foot 20 to engage a recessed area of a workpiece and secure the drill 10 in position relative to the workpiece. The pusher member 30 is substantially aligned with the forward end of the foot 20 and is carried by a plate-like housing 26 positioned above the gear housing opposite the foot 20. The pusher housing 26 is attached to the foot 20 by means of four screws 58. The screws 58 are preferably sized (e.g. ¼ inch diameter) to be the weak point in the structure of the drill 10. The screws 58 are relatively inexpensive and easy to replace, and their failure could prevent damage to other portions of the drill 10. The length of the screws 58 may be varied to adjust the position of the pusher member 30 to workpieces with varying dimensions. Referring to FIGS. 3 and 4, the pusher housing 26 has a chamber formed therein in which a piston 28 reciprocates. The pusher member 30 is secured to the top surface of the piston 28. The bottom surface of the piston 28 is exposed to fluid pressure from a reservoir 38. As shown in FIGS. 1–4, the reservoir 38 is mounted on the pusher housing 26. In some situations, it would be preferable to mount the reservoir 38 at a more rearward location to allow access to more deeply recessed drill locations, and to provide a conduit between the reservoir 38 and the pusher housing 26. In the illustrated arrangement, fluid from the reservoir 38 enters the pusher housing 26 through a conduit 42 extending from the lower portion of the reservoir 38 and communicating with the lower surface of the piston 28 via passageways 36, 34. The piston 28 is provided with an annular seal 32. The upper surface of the piston 28 is exposed to atmospheric pressure via the opening in the housing 26 through which the pusher member 30 extends. The housing 26 may be formed from a single plate member. In such case, a retaining clip 37 retains the piston 28 in the housing 26, passageways 34, 36 are drilled from outer surfaces of the plate 26, and the outer ends of the drilled passageways 34, 36 are plugged.

The internal structure and functioning of the reservoir 38 is illustrated in FIG. 10. The reservoir body defines an upper chamber and a smaller lower chamber. A piston 44 reciprocates in the upper chamber and, with the reservoir body, defines a variable volume pressure chamber 48. The piston 44 is provided with a seal 46. The portion of the upper chamber above the piston 44 is exposed to a source of pressurized air via a supply conduit 40. The piston 44 is connected to a second smaller piston 52 by means of a piston rod 49. The second piston 52 reciprocates in the lower chamber formed by the reservoir housing. In the lower chamber, the area above the piston 52 forms a variable volume air chamber 50. The area below the piston 52 is filled with an incompressible fluid. The second piston is provided with a seal 54. Two seals 56 are provided around the rod 49 between the upper and lower chambers.

In operation, pneumatic pressure is applied to the upper surface of the piston 44 through the conduit 40. This forces the piston 44 downwardly to compress the air in the chamber 88. At the same time, the piston 52 is forced downwardly to allow the air in the chamber 50 to expand and to force the incompressible fluid out of the reservoir 38 through the conduit 42 and against the lower surface of the piston 28 via the passageways 34, 36. This moves the piston 28 upwardly to urge the pusher member 30 against a surface of a recessed area of a workpiece opposite a surface to be drilled. The pusher member is released by relieving the pressure on the upper surface of the piston 44. This allows the pressure of the compressed air in chamber 48 to move the piston 44 upwardly. Piston 52 moves with piston 44 to allow atmospheric pressure to move piston 28 and pusher member 30 downwardly to disengage pusher member 30 from the workpiece.

The cooperation of the pusher member 30 and foot 20 to secure the drill 10 in position relative to a workpiece when a hole is to be drilled inside a recessed area of the workpiece is illustrated in FIG. 2. The workpiece shown in FIG. 2 is a simplified form of a portion of a composite material aircraft fuel tank. The tank includes a skin 4 and integral stringers 6. The drilling operation is necessary to attach a titanium seal pan 2 to the skin 4. When installed, the seal pan 2 acts as a fuel dam between wet and dry areas of the fuel tank. As shown in FIG. 2, the narrow forward end of the drill 10 has been positioned inside the recessed area formed by the seal pan 2 to position the bit 74 for drilling a hole 8 to receive a fastener. The pusher member 30 has been activated by supplying pneumatic pressure to the reservoir 38 and is urged against the downwardly facing upper wall surface inside the seal pan 2. This in turn urges the bottom surface of the foot 20 against the opposite surface of the seal pan 2 at which the drilling commences. The cooperation of the foot 20 and pusher member 30 securely wedges the forward portion of the drill 10 inside the seal pan 2 and secures the drill 10 relative to the workpiece.

In the simplified structure shown in FIG. 2, the skin has a planar configuration. In most situations, such a skin would be curved to correspond to the curvature of the structure, such as a wing, in which the fuel tank is formed. The structural and functional cooperation of the pusher member 30 and the foot 20 are designed to accommodate various workpiece surface configurations and to securely wedge the forward end of the drill 10 between curved, as well as flat, surfaces.

In situations where the underside of the workpiece being drilled is accessible, the drill 10 may be secured in position relative to the workpiece by a clamp, such as a C-clamp, that clamps the workpiece and the foot 20 together. The foot 20 may be clamped to either the workpiece surface facing the bit 74 or the opposite underside. In the latter case, the limit on the retracting travel of the gear housing must be set to allow clearance between the retracted bit 74 and the workpiece.

Referring to FIGS. 3-5, the drill 10 includes a drill spindle 62 carried by the forward end of the gear housing. The spindle 62 is oriented perpendicularly to the main longitudinal axis X (FIG. 5) of the gear housing. The spindle 62 is adapted to hold a drill bit 74 to extend downwardly from the lower surface of the bottom housing portion 12, as shown in FIGS. 3 and 4. The bit 74 is secured to the spindle 62 by means of a nut 68 that is threadedly connected to the lower end of the spindle 62. Needle bearings 72 support the lower end of the spindle 62. A gear 64 is integrally formed by the upper end of the spindle 62. Needle thrust bearings 70 positioned above the gear 64 provide additional support and stability for the spindle 62. The mounting of spindle 62 is somewhat loose until a load is applied to a bit 74 carried by the spindle 62. The load pushes the spindle gear 64 against the thrust bearings 70. This provides stability and makes the drill line perpendicular.

The fluid inducer 18 mentioned above is mounted on the upper housing portion 14 above the spindle 62. The inducer 18 has a cylindrical projection 19 that extends downwardly into the gear portion 64 of the hollow spindle 62. A passageway 78 is formed in the inducer 18 and has an outer end that opens onto an outer surface of the inducer 18 and an inner end that opens onto a lower surface of the projection 19. The outer end of the passageway 78 is adapted to receive a conduit, such as the conduit 80 shown in FIG. 1, for conveying fluid coolant from a reservoir or other source. The central axial passageway 66 of the hollow spindle 62 communicates with the inner end of passageway 78 for receiving coolant fluid. The passageway 66 communicates with an axial passageway 76 in the bit 74 to deliver fluid to the tip of the bit 74 for cooling the portion of a workpiece being drilled. A seal 17 is preferably provided between the projection 19 and the spindle 62. As shown, the seal 17 is positioned in an annular groove in the spindle 62. It could also be positioned in a groove on the projection 19 to reduce friction.

The spindle 62 is driven by the motor 82. The drive shaft 84 of the motor 82 is spaced rearwardly from the spindle 62 along the axis X. In the preferred embodiment shown in the drawings, the drive shaft 84 is parallel to the spindle 62. This arrangement is preferred since it helps to maximize the overall compactness of the drill 10 and simplifies the structure of the drill 10. However, it is intended to be understood that the drive shaft could also have a different orientation, such as a right angle orientation, without departing from the spirit and scope of the invention.

Drive train means is provided in the gear housing for transmitting rotation of the drive shaft 84 to rotate the spindle 62. The drive train means may take various forms, such as, for example, a gear train or a belt and pulley mechanism. In the preferred embodiment, the drive train means comprises a plurality of gears forming a gear train. This form of the drive train means is preferred since it is reliable and durable and provides a ready means for adapting the drill 10 to the needs of a particular application simply by adjusting the gear ratios. In addition, portions of the gear train may be provided in modular form so that the portions can be removed and replaced to adapt a particular drill to different workpieces by varying the feed rate and drilling speed of the drill.

Referring to FIGS. 3 and 4, in the preferred embodiment, the parallel drive shaft 84 of the motor 82 extends downwardly through needle support bearings 88, a pinion gear 134, and a gear 104. The portion of the shaft 84 extending through the bearings 88 and pinion gear 134 is smooth. The gear 134 rotates about the shaft 84. The lower end of the shaft 84 has splines 86 formed thereon which connect it to the gear 104 to transmit rotation of the shaft 84 to the gear 104.

The drill of the invention is provided with an elongated feed member 92 oriented parallel to the spindle 62 and positioned between the spindle 62 and the motor drive shaft 84. The feed member 92 has a lower or outer end attached to the foot 20. The drive train means engages the feed member 92 to translate the gear housing relative to the feed member 92 toward and away from the foot 20. Like the portion of the drive means that transmits rotation to the spindle 62, the portion of the drive means that translates the gear housing preferably takes the form of a plurality of gears. The elongated feed member 92 is preferably in the form of the lead screw 92 shown in the drawings. However, it may also take other forms, such as a rack and pinion mechanism.

Referring to FIGS. 3 and 4, the lead screw 92 of the preferred embodiment has external threads 93 for threadedly engaging the spindle drive train. The lead screw 92 is also provided with two diametrically opposite longitudinal slots 94 (FIG. 11) for rotational engagement by the feed drive train. The lead screw 92 is mounted on the drill 10 by a mounting pin 96. The upper end of the mounting pin 96 is secured to an upper support plate 60 by means of a screw 7. The lower end of the pin 96 is secured to the foot 20 by a lower mounting flange 102 that is attached to the foot 0 by suitable fasteners. The upper end of the lead screw 2 adjacent to the support plate 60 has a radial flange 98 formed thereon. A thrust bearing 100 is positioned between the flange 98 and the plate 60. The lead screw may easily be removed and replaced to adjust the feed rate of the drill 10.

Referring to FIGS. 3–6, the gear 104 which is spline-connected to the drive shaft 84 engages a gear 106 that is threaded onto the lead screw 92. The gear 106 in turn engages a gear 108. The gear 108 is mounted on the bottom and top housing portions 12, 14 by a pin 112. A ball bearing 110 is positioned between the gear 108 and the pin 112. The gear 108 engages the lower portion 114 of a piggyback gear 114, 116. The gear 114, 116 is mounted on the housing portions 12, 14 by a pin 120 and rotates around ball bearings 118. The upper portion 116 of the piggyback gear 114, 116 has a larger diameter than the lower portion 114 and engages the gear 64 carried by the top portion of the spindle 62.

In summary, the drive train for rotating the spindle 62 and a bit 74 carried thereby includes the output shaft 84 of the motor 82, the gear 104 that is spline-connected to the shaft 84, the gear 106 that is threaded onto the lead screw 92, the gear 108 that is mounted by the pin 112, the lower piggyback gear portion 114 that is mounted by the pin 120, the upper piggyback gear portion 116 that rotates with the lower gear portion 114, and the gear 64 carried by the spindle 62.

The motor 82 also drives rotation of the lead screw 92. To accomplish this, the gear 104 engages a gear 122 postioned rearwardly of the drive shaft 84. The upper surface of the gear 122 has a plurality of dog-clutch teeth 124 formed thereon, as shown in FIGS. 3, 4, and 6. These clutch teeth 124 are positioned to engage corresponding teeth 132 on the lower surface of a gear 130 positioned above the gear 122. A clutch operating mechanism, described further below, is provided for moving gear 130 toward and away from gear 122 to bring the teeth 124, 132 into and out of engagement with each other. The lower clutch gear 122 is mounted on the gear housing by a pin 126 that extends from the bottom housing portion 12 to the motor adapter 16. The gear 122 rotates about ball bearings 128.

The upper gear 130 engages the pinion gear 134 which rotates freely about the drive shaft 84. As can be seen in FIGS. 3 and 4, the gear teeth of the pinion gear 134 are axially elongated to accommodate reciprocation of the gear 130 when the clutch is operated. The pinion gear 134 engages a gear 136 which is keyed onto lead screw 92 to rotate therewith. The gear 136 has two diametrically opposed keys 137 which are engaged in the longitudinal slots 94 on the lead screw 92, as shown in FIG. 11. The keys 137 are longitudinally slidable in the slots 94 to accommodate translation of the gear housing relative to the lead screw 92. Ball bearings 198 are provided between an upward axial extension of bearing 106 and a lower portion of the bearing 136. Needle bearings 196 support the gears 106, 136. Needle thrust bearings 194 provide additional support for the bearing 136.

In summary, the lead screw drive train includes the motor drive shaft 84, the spline-connected gear 104, gear 122, dog clutch 124, 132, gear 130, pinion gear 134, and gear 136 which is keyed to the lead screw 92.

Referring to FIGS. 3 and 4, the dog clutch is activated by the reciprocation of a piston 138 in a chamber defined by the top housing portion 14 and the motor adapter 16 above the gears 122, 130. A spindle 142 extends axially downwardly from the piston 138 through the housing portion 14 and the gear 132. The piston 138 and spindle 142 slide along the pin 126. A seal 140 is provided between the piston 138 and the chamber wall defined by the housing portion 14. A second seal 144 is provided between the spindle 142 and the housing portion 14. The seal 144 is held in position by an annular housing insert 139. The bottom of the spindle 142 has a radial flange 146 formed thereon for mounting a ball bearing 148. The gear 130 rotates about the bearing 148. The bearing 148 and the gear 130 are press fit to translate with the spindle 142. In the operation of the clutch, air pressure is applied to the top of the piston 138 to move the piston 138 downwardly and thereby move the gear 130 downwardly into engagement with the gear 122, as shown in FIG. 4. Air pressure is applied to the opposite lower side of the piston 138 to move the piston 138 and gear 130 upwardly to disengage the gears 122, 130, as shown in FIG. 3, and thereby disengage rotation of the lead screw 92.

The drill 10 includes a valve 150 for controlling reciprocation of the piston 138. The valve 150 includes a valve body 154 and valve spool 156 positioned in an opening formed by the top housing portion 14. A supply conduit 152 extends through the sidewall of the housing portion 14 to supply pressurized air to the valve 150, as shown in FIGS. 3–5. The details of the structure of the valve 150 are best seen in FIG. 12.

An adjustment screw 158 is threadedly connected to the top portion of the valve spool 156 and extends upwardly out through the top housing portion 14. The adjustment screw 158 may be rotated relative to the spool 156 to adjust operation of the valve 150. The top portion of the adjustment screw 158 extends through an opening in the support plate 60. Upper and lower stops 160, 162 are threaded onto the adjustment screw 158 above and below the support plate 60. These stops 160, 162 define the limits of travel of the gear housing relative to the foot 20 and can be adjusted to adjust such limits. Preferably, means are provided for preventing incorrect adjustment of the stops 160, 162 which would allow overtravel of the gear housing in either direction.

In the operation of the drill 10, pressurized air enters the top portion 14 of the gear housing through the conduit 152. Referring to FIG. 12, a passageway 163 is formed in the housing portion 14 and communicates with the passageway in the conduit fitting. The passageway 163 has a radial portion that opens onto an inner surface of the opening in the housing portion 14 into which the valve body 154 and valve spool 156 are recieved. The vertical portion of passageway 163 may extend all the way down to the bottom surface of the housing portion 14 to facilitate drilling of the passageway 163. The bottom end of the passageway 163 may be plugged or may conveniently be threaded for receiving a fastener that attaches housing portions 12, 14 to each other. The radial portion of passageway 163 is in communication with an inlet passageway 164 formed in the valve body 154. The passageway 164 has an outer annular portion and a plurality of radial portions that extend radially inwardly to an inner circumferential surface of the valve body 154 which defines an axial opening into which the valve spool 156 is received.

FIG. 12 shows the valve 150 in a rest position in which the pressurized air from passageway 164 enters an annular groove 165 on the valve spool 156 and is trapped in the annular groove 165. With the spool 156 in this position, the pressurized air has no pathway to either side of the clutch piston 138. Slight movement of the spool 156 either upwardly or downwardly activates the valve and allows pressurized air to be delivered to the piston 138.

At the end of the feed cycle, the upper stops 160 contact the upper support plate 60 to move the valve spool 156 upwardly relative to the valve body 154. As soon as the spool 156 begins to move upwardly, communication is opened between the inlet groove 165 and an annular retract groove 166 formed on the valve body 154. Pressurized air entering the groove 166 moves into a plurality of vertical passageways 168 formed in the valve body 154. The pressurized air in the vertical passageways 168 acts on a washer 175, which functions as a piston. The washer 175 is secured to the upper end of the valve spool 156 by the adjustment screw 158. The action of the pressurized air against the washer 175 moves the spool 156 all the way up into its fully raised position immediately following the commencement of upward movement of the spool 156. This snap action of the valve 150 provides almost instantaneous activation of the retraction of the drill bit 74.

The retraction is accomplished by moving the piston 138 upwardly to disengage the dog clutch. The piston 138 is moved by pressurized air being delivered to its lower surface from the vertical passageways 168 in the valve body 154. Retract outlet passageways 170 in the valve body 154 communicate the passageways 168 with a passageway 172 formed in the housing portion 14. The housing passageway 172 communicates with the lower portion of the piston chamber to act on the lower surface of the piston 138. Upon disengagement of the dog clutch, the drill 10 retracts rapidly. Means could be provided for automatically preventing the drill 10 from recommencing a drilling cycle upon the end of the retraction cycle. However, the end of the retraction cycle is readily apparent to the operator. Therefore, it is much more economical to deactivate the drill 10 at the end of the retraction cycle simply by releasing the trigger (not shown).

At the end of the retraction cycle, the lower stops 162 contact the upper support plate 60 to move the valve spool 156 downwardly. This positions the valve spool 156 for the commencement of a new drilling operation. If the spool 156 is not quite moved into its feed position, such as when the retraction cycle is not fully completed when the trigger is released, it will be moved downwardly as soon as the trigger is pulled again and the retraction cycle is completed.

In the feed cycle, pressurized air from the annular inlet groove 165 on the valve spool 156 enters annular groove 167 on the valve body 154. This movement of the pressurized air is made possible by slight downward movement of the valve spool 156 from the position shown in FIG. 12. Air from the groove 167 enters vertical passageways 169 formed in the valve body 154 and act on a lower piston 176 formed by an integral annular flange on the lower portion of the valve spool 156. The action of the air against the flange 176 immediately moves the spool 156 all the way down into its full feed position to ensure that the valve 150 is fully actuated. Air from the vertical passageways 169 also exits the valve body 154 through passageways 171 formed in the valve body 154. The passageways 171 communicate with a passageway 173 in the gear housing portion 14. The passageway 173 extends radially outwardly from the passageways 171 and then upwardly to the upper end of the housing portion 14. A groove 174 is formed on the upper surface of the housing portion 14 and communicates with the piston chamber to deliver pressurized air to the upper surface of the piston 138.

In both the retract and feed cycles, air is exhausted from the surface of the piston 138 opposite the surface to which pressurized air is being delivered. In the retract cycle, air from the upper surface of the piston 138 moves through housing groove 174 and housing passageway 173 and into the valve body through passageways 171. The exhausting air from passageways 171 enters the vertical passageways 169 and annular groove 167. In the upper position of the valve spool 156, groove 167 communicates with an exhaust groove 181 on the valve spool 156. Radial passageways 179 extend from groove 181 to a central axial exhaust passageway 178. During the feed cycle, air is exhausted from the lower surface of the piston 138 via housing passageway 172 and valve body passageways 170, 168. Passageways 168 communicate with the central exhaust passageway 178 in the spool 156 via an annular groove 180 on the valve spool 156 and radial passageways 161.

As noted above, the drill 10 preferably has means for preventing overtravel of the gear housing. To prevent overtravel in the feed direction, the preferred embodiment of the valve spool 156 has a lower extension 177, as shown in FIGS. 3, 4, and 12. The extension 177 contacts the foot 20 to move the valve spool 156 upwardly. This automatically activates the retraction cycle to prevent overtravel when the upper stop 160 is incorrectly adjusted. Overtravel in the retract direction is prevented by the positioning of the upper support plate 60. This positioning makes it impossible to adjust the lower stop 162 beyond the safe limits of retraction.

As noted above, an important feature of the invention is the inclusion in the drill 10 of a leader pin or pins to provide stiffness between the gear housing and the workpiece-engaging foot 20. The pin or pins are parallel to the feed member 92. In the preferred embodiment, two leader pins 182 are provided and are positioned on laterally opposite sides of the drive shaft 84. The pins 182 are spaced laterally and rearwardly from the drive shaft 84. One of the leader pins 182 can be seen in the background behind the dog clutch mechanism in FIGS. 3 and 4. The foreground leader pin 182 is visible in FIGS. 1 and 2. As can be seen in FIGS. 1-4, the top of each leader pin 182 is secured to the support plate 60 by a screw 183 of the same general type as the screw 97 that secures the top of the lead screw mounting pin 96. The bottom end of each pin 182 is secured to the foot 20 by means of an integral mounting flange 192 and suitable fasteners.

FIGS. 5 and 7-9 show the details of the structure surrounding the pins 182. For each pin 182, the lower housing portion 12 has a cylindrical upward extension 188 that houses a bearing cylinder or ball cage 184. The leader pin 182 extends through the bearing cylinder 184 and is engaged by ball bearings 186 carried by the cylinder 84. FIGS. 8 and 9 show the structure of the bearing cylinder 184 and the arrangement of the ball bearings 186 in detail. The engagement of the leader pin 182 by the ball bearings 186 allows the gear housing portions 12, 14 to slide freely along the pin 182 and cooperates with the pin 182 to provide stiffness between the gear housing and the foot 20. The leader pin 182 is interference fit into the bearing cylinder 184 to provide a high degree of stiffness. This high degree of stiffness is necessary for drilling materials like titanium, but it limits the amount of travel of the gear housing. The bearing cylinder 184 translates within the housing as the housing translates, moving about ½ inch for each inch of housing travel.

The operation of the drill 10 should be apparent from the foregoing description and can be summarized as follows. With the gear housing in the retracted position shown in FIG. 3, the drill 10 is positioned relative to a workpiece with the bit 74 in position to drill a hole. Preferably, the drill 10 is secured in position relative to the workpiece. When a recessed area of a workpiece is to be drilled, such as in the situation illustrated in FIG. 2, pressurized air is supplied to the reservoir 38 to activate the push member 30, as described above. When the forward end of the drill 10 has been firmly wedged within the recessed area by the cooperation of the foot 20 and pusher member 30, the motor 82 is activated to rotate the drive shaft 84. Preferably, the motor 82 is pneumatic and is activated by supplying pressurized air thereto.

The rotation of the drive shaft 84 is transmitted to the spindle 62 by the spindle drive train described above. In order to move the bit 74 toward and into the workpiece, the dog clutch is engaged by supplying pressurized air to the top surface of the piston 138 through the valve 150. When the clutch is engaged, gear 122 transmits rotation to gear 130 to thereby drive rotation of the lead screw 92. A substantial gear reduction between gears 106 and 136 creates a controlled positive feed of the drill bit 74 by translating the gear housing downwardly along the lead screw 92 toward the foot 20. FIG. 4 illustrates the positions of the drill portions at the end of the feed cycle.

When a predetermined depth of drilling has been achieved, the upper stops 160, which have been preset to the desired depth, contact the support plate 60 to activate the valve 150 and disengage the clutch. In its disengaged position, the top surface of gear 130 frictionally engages the adjacent radial surface of the housing portion 14 to cease rotation of the gears 130, 134, 136 and thereby stop the rotation of the lead screw 92. The stopping of the rotation of the lead screw 92 results in fast reverse upward travel of the gear 106 along the stationary lead screw 92, e.g. reverse travel 14 times the feed rate. This moves the gear housing and all the parts of the drill 10 carried thereby upwardly toward the raised position shown in FIG. 3. Engagement of the lower stop 162 against the support plate 60 stops the retraction of the gear housing. The drill 10 is then ready to commence another drilling operation. FIG. 3 shows the valve 150 just before it is activated by engagement of the stop 162 by the plate 60.

Figure 1:
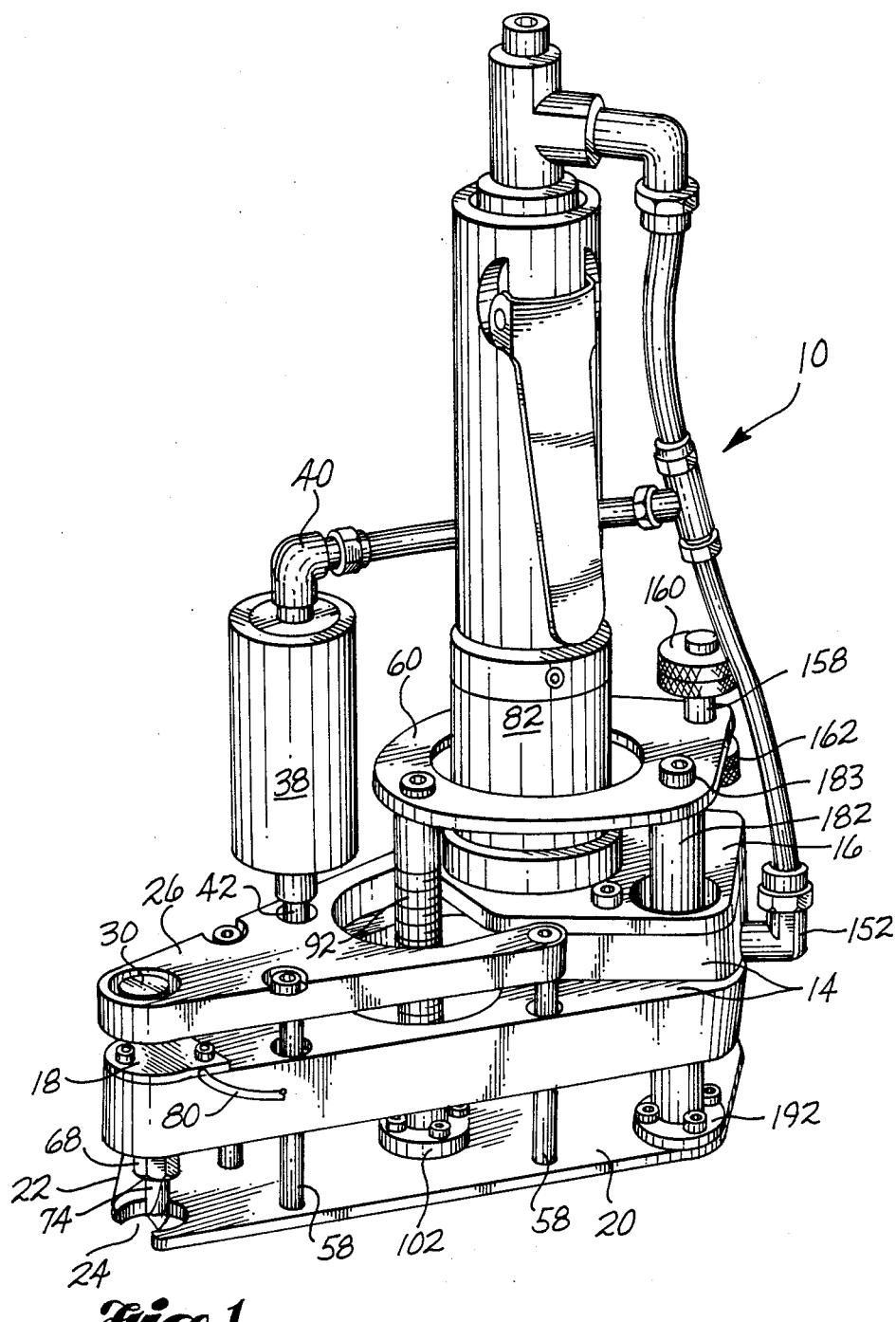
FIG. 1 is a pictorial view of the preferred embodiment of the drill.

As used herein, the terms "top", "bottom", "downwardly", and the like are used to refer to the use orientation shown in FIGS. 1 and 2. The use of such terms is intended to facilitate the description of the invention and is not in any way intended to limit the invention to the illustrated use orientation. It is intended to be understood that the drill of the invention may also be used in a variety of other orientations.

It will be obvious to those skilled in the art to which this invention is addressed that the invention may be used to advantage in a variety of situations. Therefore, it is intended to be understood by those skilled in the art that various modifications and omissions in form and detail may be made without departing from the spirit and scope of the invention as defined by the following claims.

What is claimed is:
1. A positive feed drill comprising:

a housing elongated along a main axis;
a drill spindle carried by a forward end portion of the housing, said spindle being perpendicular to said axis and adapted to hold a drill bit;
a motor carried by the housing and having a drive shaft spaced rearwardly from said spindle along said axis;
a foot positioned to engage a workpiece;
an elongated feed member parallel to said spindle, positioned between said spindle and said drive shaft, and having an outer end attached to said foot;
drive train means in the housing for transmitting rotation of said drive shaft to rotate said spindle, and to translate the housing relative to said feed member toward and away from said foot;
at least one leader pin parallel to and spaced rearwardly from said feed member and having an outer end attached to said foot; and
bearing means carried by the housing for engaging said pin to allow the housing to slide freely along said pin, said bearing means cooperating with said pin to provide stiffness between the housing and said foot.

2. The drill of claim 1, comprising two said leader pins positioned on laterally opposite sides of said drive shaft.

3. The drill of claim 1, in which said leader pin is positioned rearwardly of said drive shaft.

4. The drill of claim 2, in which said leader pins are spaced laterally and rearwardly from said drive shaft.

5. The drill of claim 1, in which said foot has a forward end positioned and dimensioned to fit inside a recessed area of a workpiece having a surface to be drilled; and which further comprises a pusher member substantially aligned with said forward end and movable away from said forward end to engage, inside said recessed area, a second surface opposite said surface, to secure the drill in position relative to the workpiece.

6. The drill of claim 5, comprising a fluid activated cylinder for moving said pusher member away from said foot end.

7. The drill of claim 5, comprising two said leader pins positioned on laterally opposite sides of said drive shaft.

8. The drill of claim 5, in which said leader pin is positioned rearwardly of said drive shaft.

9. The drill of claim 7, in which said leader pins are spaced laterally and rearwardly from said drive shaft.

10. The drill of claim 1, in which said feed member comprises a lead screw that is rotated by said drive train means.

11. The drill of claim 1, in which said drive train means comprises a plurality of gears for transmitting rotation of said drive shaft.

12. The drill of claim 1, in which said feed member comprises a lead screw, and said drive train means comprises a plurality of gears for transmitting rotation of said drive shaft to rotate said spindle and said lead screw.

13. The drill of claim 12, in which the drive train means includes a dog-type clutch for engaging and disengaging rotation of said lead screw.

14. The drill of claim 13, comprising a fluid activated cylinder to move one of said gears toward and away from another of said gears to operate said clutch.

15. The drill of claim 6, in which said drive train means comprises a plurality of gears, and a dog-type clutch; and which comprises a fluid activated cylinder to move one of said gears toward and away from another of said gears to operate said clutch.

16. The drill of claim 1, in which said drive shaft is parallel to said spindle.

17. The drill of claim 16, comprising two said leader pins positioned on laterally opposite sides of said drive shaft.

18. The drill of claim 16, in which said leader pin is positioned rearwardly of said drive shaft.

19. The drill of claim 17, in which said leader pins are spaced laterally and rearwardly from said drive shaft.

20. The drill of claim 16, in which said foot has a forward end positioned and dimensioned to fit inside a recessed area of a workpiece having a surface to be drilled; and which further comprises a pusher member substantially aligned with said forward end and movable away from said foot end to engage, inside said recessed area, a second surface opposite said surface, to secure the drill in position relative to the workpiece.

21. The drill of claim 20, comprising two said leader pins positioned on laterally opposite sides of said drive shaft.

22. The drill of claim 20, in which said leader pin is positioned rearwardly of said drive shaft.

23. The drill of claim 21, in which said leader pins are spaced laterally and rearwardly from said drive shaft.

24. The drill of claim 1, further comprising a passageway formed by the housing and having a first end opening onto an outer surface of the housing for receiving an end of a conduit, and a second end positioned to communicate with an axial opening in said spindle to deliver fluid coolant to an axial opening in a drill bit held by said spindle.

25. The drill of claim 1, further comprising a snap action valve for commencing retraction of said housing away from a workpiece substantially instantaneously when the drill bit reaches a predetermined drilling depth.

26. The drill of claim 13, further comprising a snap action valve for activating disengagement of said clutch to commence retraction of said housing away from a workpiece substantially instantaneously when the drill bit reaches a predetermined drill depth.

27. The drill of claim 14, further comprising a snap action valve for delivering fluid to said cylinder to activate disengagement of said clutch to commence retraction of said housing away from a workpiece substantially instantaneously when the drill bit reaches a predetermined drilling depth.

* * * * *

UNITED STATES PATENT AND TRADEMARK OFFICE
CERTIFICATE OF CORRECTION

PATENT NO. : 4,890,962

DATED : January 2, 1990

INVENTOR(S) : Daniel L. Nydegger

It is certified that error appears in the above-identified patent and that said Letters Patent is hereby corrected as shown below:

Col. 2, line 63, "disclose as" should be -- discloses --.

Col. 3, line 46, "o" should be -- no --.

Col. 4, line 50, "test" should be -- best --.

Col. 5, line 12, "Fig. 12" begins a new paragraph.

Col. 6, line 3, "Referring" begins a new paragraph.

Col. 6, line 38, ".reservoir" should be -- reservoir --.

Col. 6, line 47, "chamber 88" should be -- chamber 48 --.

Col. 7, lines 48 and 49, between the words "for the" and "spindle 62", first occurrence, there should be no gap.

Col 8, line 64, "screw 7" should be -- screw 97 --;
in line 66, "foot 0" should be -- foot 20 --; and
in line 67, "screw 2" should be -- screw 92 --.

UNITED STATES PATENT AND TRADEMARK OFFICE
CERTIFICATE OF CORRECTION

PATENT NO. : 4,890,962
DATED : January 2, 1990
INVENTOR(S) : Daniel L. Nydegger It is certified that error appears in the above-identified patent and that said Letters Patent is hereby corrected as shown below:

Col. 12, lines 56 and 57, "cylinder 84" should be -- cylinder 184 --.

Claim 5, col. 14, line 36, change "forward end" to-- foot --.

Claim 6, col. 14, line 41, delete "end".

Claim 20, col. 15, 6th line of claim, delete "end".

Signed and Sealed this

Thirtieth Day of July, 1991

Attest:

HARRY F. MANBECK, JR.

Attesting Officer

Commissioner of Patents and Trademarks